May 30, 1933.   G. T. COOKE   1,911,990
COTTER PIN SPREADER
Filed Sept. 29, 1932
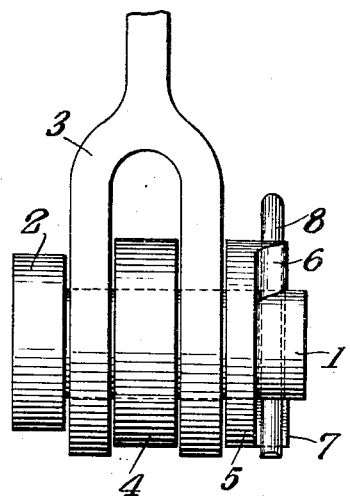
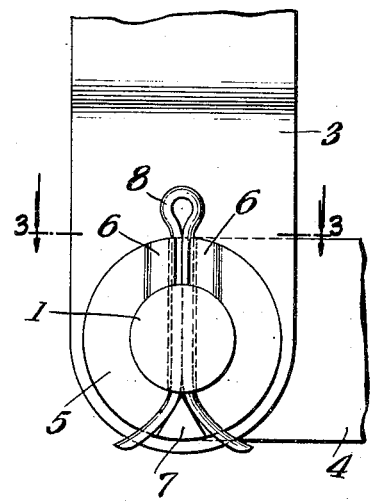
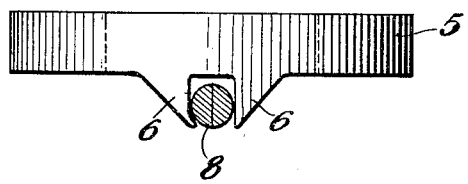
INVENTOR
GEORGE T. COOKE
BY
ATTORNEYS Patented May 30, 1933

1,911,990

UNITED STATES PATENT OFFICE

GEORGE THOMAS COOKE, OF SOUTH NORWALK, CONNECTICUT

COTTER PIN SPREADER

Application filed September 29, 1932. Serial No. 635,340.

This invention relates to cotter pin spreaders in which the cotter pin ends are automatically separated and bent apart as incidental to the act of driving it into place.

The object of the present invention is to improve the construction so as to effect substantial economies in production and cost of distribution.

Another advantage is the ease and speed with which the spreaders may be applied.

Other advantages will be apparent to the mechanic skilled in the use of such devices.

In the drawing—

Fig. 1 is a side view of my invention as it appears in use;

Fig. 2 is an end elevation of certain parts shown in Fig. 1, one of said parts being in section;

Fig. 3 is a section on the line 3—3 of Fig. 2.

1 represents a pin or stud having the usual head 2. Near the free end of the stud is the usual transverse passage to receive a cotter pin. 3—4 represent conventional parts to be held together by the stud 1, there being registering passages in said parts through which the stud may be passed. The cotter pin spreader comprises a washer 5 of wrought or malleable metal which slidably fits on the stud 1 so that when in place it will be located between the shank of the cotter pin and the adjacent wall of the part 3. 6—6 are two upstanding guide lugs which are integral with and rise up from the face of the washer 3 at one side of the passage through the washer, said lugs being broadest at the base, and being relatively narrow at the outer ends whereby said ends may be bent laterally for the purpose hereinafter described. These guide lugs are spaced apart to correspond substantially to the diameter of the cotter pin shank as shown in Fig. 1. On the same face of the washer, but at the diametrically opposite side thereof, is located a wedge 7 which is integral with the washer and rises up from the face thereof. The apex of the wedge faces toward the passage through the washer. 8 represents the head of a cotter pin. When the washer is in place on the stud, the guide passage between the lugs 6—6 is positioned at one end of the cotter pin passage through the stud 1. The cotter pin is then entered between the lugs 6—6 and into the passage in the stud. As soon as it enters this passage, the washer will be held from turning sufficiently to throw the wedge on the opposite side of the washer out of line with the exit end of the passage through the stud. Thus, when the ends of the cotter pin emerge from said passage, they are bound to engage the apex of said wedge and be spread apart by the opposite inclines thereof as the pin is driven in. When the pin is in its "home" position shown in Fig. 2, the bendable end of one or both of the lugs 6—6 may be bent laterally so as to overstand the outer side of the cotter pin shank as best seen in Fig. 3 wherein I have shown one lug end bent in and the other as yet unbent. This serves to secure the washer to the cotter pin so that in the event there happens to be excessive clearance between the back of the washer and the adjacent wall of the part 3, the washer will still be held by the cotter pin and cannot escape therefrom.

By this construction, I am enabled to manufacture these devices with great rapidity by the drop forging process, and the metal being wrought permits the outer ends of the lugs 6—6 to be bent over the outside of the cotter pin shank whenever desired, and with perfect safety. The device may also be cast in malleable iron, which will also permit the ends of the guide lugs to be bent over as described. By this construction I effect not only a great saving in cost of metal, but I also produce an effective spreader of very light weight. This results in a great saving in cost of production and also in cost of transportation.

What I claim is:

1. In a cotter pin spreader wherein the cotter pin is provided with a shank and a head of larger diameter than said shank, a washer, two upstanding integral lugs on one face thereof at one side of the passage through the washer, said lugs being spaced apart to correspond substantially to the diameter of the cotter pin shank and forming a radial guide passage therefor, a wedge on the same face of said washer but on the opposite side thereof and integral therewith, the apex of said wedge facing toward the passage through the washer.

2. A cotter pin spreader wherein the cotter pin is provided with a shank and a head of larger diameter than said shank and comprising a washer, two upstanding guide lugs integral therewith and projecting above the face of said washer adjacent to the passage therethrough, and spaced to correspond substantially to the diameter of the cotter pin shank and forming a radial passage therefor, both of said lugs having a relatively narrow laterally bendable end, and an outwardly projecting wedge on the same face of said washer but located diametrically opposite to the passage between the guide lugs, the apex of said wedge facing toward the passage through said washer.

3. In a cotter pin spreader for a cotter pin having a shank and a head larger than said shank, a washer, a wedge on one face thereof and integral therewith, the apex of said wedge facing the passage through said washer, means on the same face of said washer and integral therewith but on the opposite side of said washer, comprising two separate spaced guide lugs having an elongated guide passage between them for supporting the shank of a cotter pin on opposite sides to guide it in a definite path toward the apex of said wedge, the outer end of one of said guide lugs being laterally bendable over the shank of a cotter pin.

GEORGE THOMAS COOKE.